United States Patent [19]
Weingard

[11] Patent Number: 5,493,688
[45] Date of Patent: * Feb. 20, 1996

[54] PATTERN CATEGORITZATION SYSTEM HAVING SELF-ORGANIZING ANALOG FIELDS

[75] Inventor: Fred S. Weingard, Fairfax, Va.

[73] Assignee: Booz, Allen & Hamilton, Inc., McLean, Va.

[*] Notice: The portion of the term of this patent subsequent to Jan. 12, 2000, has been disclaimed.

[21] Appl. No.: 002,155

[22] Filed: Jan. 11, 1993

Related U.S. Application Data

[63] Continuation-in-part of Ser. No. 726,052, Jul. 5, 1991, Pat. No. 5,179,596.

[51] Int. Cl.$^6$ .................................................. G06T 1/40
[52] U.S. Cl. .................................................. 382/157; 395/23
[58] Field of Search .......................... 382/14, 15, 36, 382/156, 157, 158; 395/20, 23; 364/715.06

[56] References Cited

U.S. PATENT DOCUMENTS

| | | | |
|---|---|---|---|
| 4,914,708 | 4/1990 | Carpenter et al. | 382/14 |
| 5,003,490 | 3/1991 | Castelaz et al. | 364/513 |
| 5,048,100 | 9/1991 | Kuperstein | 382/15 |
| 5,052,043 | 9/1991 | Gaborski | 382/14 |
| 5,058,180 | 10/1991 | Khan | 382/14 |
| 5,058,184 | 10/1991 | Fukushima | 382/37 |
| 5,063,601 | 11/1991 | Hayduk | 382/14 |
| 5,067,164 | 11/1991 | Denker et al. | 382/15 |
| 5,146,543 | 9/1992 | Vassiliadis et al. | 395/27 |
| 5,155,801 | 10/1993 | Lincoln | 382/14 |
| 5,179,596 | 1/1993 | Weingard | 382/15 |
| 5,239,594 | 8/1993 | Yoda | 382/15 |
| 5,253,329 | 10/1993 | Villarreal et al. | 395/23 |
| 5,263,107 | 11/1993 | Ueda et al. | 382/14 |
| 5,371,809 | 12/1994 | Desieno | 395/24 |

OTHER PUBLICATIONS

Jain et al., "A K–Nearest Neighbor Artificial Neural Network Classifier", IJCN–91—Seattle: Int. Joint Conf. Neural Networks, vol. 2, pp. 515–520, Jul. 1991.

Lippman "Intro to Computing with Neural Nets", IEEE ASSP 1987.

Kulkarni et al., "Self Organizing Neural Networks with a Split/Merge Algorithm", ACM 1990.

G. A. Carpenter and S. Grossbert, "ART2: Self-Organization of Stable Category Recognition Codes for Analog Input Patterns", a reprint from *Applied Optics*, vol. 26, No. 23, Dec. 1987, pp. 4919–4930.

Primary Examiner—Michael T. Razavi
Assistant Examiner—Jon Chang
Attorney, Agent, or Firm—Hamilton, Brook, Smith & Reynolds

[57] ABSTRACT

Pattern categorization is provided by a self-organizing analog field/layer which learns many-to-many, analog spatiotemporal mappings. The field/layer employs a set of input nodes, each input node having two long term memory weights, and a set of output nodes. Each input node is for categorizing patterns with respect to a plurality of categories. The long term memory weights of an input node encode the patterns categorized by the input node. Each input node generates signals as a function of respective long term memory weights and input signals to the input node. Each input node is coupled to a different output node. Each output node receives signals generated by the respective input node and selects a category of the respective input node. The output nodes provide a mapping between plural parts of the input pattern and plural categories of the input nodes. Category selections of the output nodes are modified such that sum of the output signals from the output nodes is within a predefined range. Upon the sum of the output signals being within the predefined range, the output nodes provide categorization of the input pattern from the mapping between plural parts of the input pattern and plural categories of the input nodes.

8 Claims, 6 Drawing Sheets

FIG. 3f y component is don't care

SOAF1 w/$\sigma_x \neq 0$, $\sigma_y = 0$ $\vee_S \ni c_{net'_j} =$ $\sum\limits_{i \in {}^c R_j} \sigma_{ij}(\gamma - |S_{ij} - \omega_{ij}|) > C$

FIG. 3e

SOAF1 w/$\sigma_x = \sigma_y \neq 0$ $\vee_S \ni c_{net'_j} =$ $\sum\limits_{i \in {}^c R_j} \sigma_{ij}(\gamma - |S_{ij} - \omega_{ij}|) > C$

FIG. 3d

Euclidean $\vee_S \ni c_{net'_j} =$ $\|\vec{S} - \vec{\omega}\| \leq \text{constant}$

FIG. 3g $\vec{\omega}$ skewed

Mahalanobis
$\vec{S} \ni c_{net'_j} =$
$(\vec{S}-\vec{\omega})^T A^{-1}(\vec{S}-\vec{\omega}) \le C$

FIG. 3h shaped elipsoid only along axes $\vec{\omega}$

SOAF2 w/ $\sigma_x \ne \sigma_y \ne 0$
$\vec{S} \ni c_{net'_j} =$
$\sum_{i \in {}^c R_j} \sigma_{ij} \left( \gamma^2 - (S_{ij} - \omega_{ij})^2 \right)$

FIG. 3i y component is don't care $\vec{\omega}$ $\omega_x$

SOAF2 w/ $\sigma_x \ne 0$; $\sigma_y = 0$
$\vec{S} \ni c_{net'_j} =$
$\sum_{i \in {}^c R_j} \sigma_{ij} \left( \gamma^2 - (S_{ij} - \omega_{ij})^2 \right)$

FIG. 4

PATTERN CATEGORITZATION SYSTEM HAVING SELF-ORGANIZING ANALOG FIELDS

RELATED APPLICATIONS

This Application is a Continuation-In-Part of U.S. application Ser. No. 07/726,052, filed Jul. 5, 1991 now U.S. Pat. No. 5,179,596.

BACKGROUND OF THE INVENTION

A neural network is generally an electronic system (usually implemented in software but may be a combination of hardware and software) for modeling or simulating the brain. All neural networks can be completely and uniquely specified by describing the four attributes of architecture, propagation rules/equations, activation rules/equations and learning rules/equations.

The architecture attribute specifies the organization of neurons or nodes (the fundamental processing element or unit of a neural network) into clusters, clusters into layers, and layers into the overall neural network. For many neural networks, clusters are not used; hence, the neurons are organized directly into layers. In addition, layers may be arranged in a hierarchy. To that end, the architecture attribute also describes the "permitted" flow of information or signals within the neural network by specifying actual (or rules for) physical (specific) and broadcast (non-specific) connectivity paths between layers, clusters, and/or neurons (nodes).

Propagation rules/equations provide a detailed description, usually mathematical, of information/signal flow for every permitted physical and broadcast connectivity path specified in the architecture. This includes initial conditions and evolution over time.

Activation rules/equations provide a detailed description, usually mathematical, of how each neuron specified in the architecture processes its information (signals) to produce output information (signals). This includes initial conditions and evolution over time. In a so called "winner take all" activation, for a given set of inputs to the network neurons, one and only one neuron outputs a logical one and all other neurons output a zero. In a "many-two-many" activation, several of the network neurons generate a non-zero output.

Learning rules/equations provide a detailed description, usually mathematical, of how each "persistent memory" in the network persists and/or changes over time. "Persistent memories" (commonly called weights or synapses) are those variables used in the propagation rules/equations or activation rules/equations, whose values must be retained for proper functioning of the neural network. This includes specification of all initial conditions for these variables.

Through learning, a neural network is trained so that application of a vector or set of inputs produces the desired (or at least consistent) set of outputs. Both output sets as well as input sets are referred to as vectors. Learning is usually accomplished by sequentially applying input vectors, while adjusting network weights according to the learning rules/equations. During learning, the network weights gradually converge to values that enable each input vector to produce the desired output vector.

Learning or training a neural network is said to be either "supervised" or "unsupervised". In supervised learning, an external "teacher" evaluates the behavior of the network and directs weight definitions accordingly. This is typically implemented by each input vector being paired with a target vector representing the desired output vector. Each pair of input vector and target vector is called a training pair. An input vector is applied, an output vector of the network is calculated and compared to the corresponding target vector, and the difference (error) is fed back through the network. As a result of this feedback, weights are changed according to the learning rules/equations which generally minimize the error. A sequence of such training pairs forms a training set. Each training pair (i.e., the vectors thereof) is applied to the neural network in sequence. The weights are adjusted for each applied vector until the error for the entire training set is below a threshold.

In unsupervised learning, there is no teacher, i.e., there are no target vectors and hence no comparison to predetermined outputs. Instead, the training set consists solely of input vectors. The learning rules/equations modify network weights (i.e., the network self-organizes) to produce output vectors that are consistent. Specifically, application of one of the training vectors produces the same output vector as application of an input vector sufficiently similar to the training vector. To that end, the learning process or training process extracts the statistical properties of the training set and groups similar input vectors into classes. Applying a vector from a given class to the network input will produce a specific output vector.

SUMMARY OF THE INVENTION

Two goals of many-layered, hierarchical, self-organizing neural networks are (i) unsupervised hierarchical clustering/categorization; and (ii) enhanced performance over two and three layer neural networks. Two less obvious but equally important goals are (iii) resource efficiency leading to greater generalization and/or storage capacity; and (iv) exploitation of potential connectivity schemes between layers within the hierarchy to achieve:

spatiotemporal feature extraction/abstraction by using time delayed connectivity schemes, the ability to "mix" primordial spatiotemporal features with abstract spatiotemporal features by using feed forward and/or feed back connectivity schemes (that may skip one or more adjacent layers in the hierarchy), and practical, many layered, self-organizing systems by exploiting random connectivity schemes (in lieu of full connectivity between layers).

The present invention provides a neural network that achieves the foregoing goals. In particular, the present invention provides a neural network formed of self-organizing, analog field layers (SOAFL) which learn many-to-many (as opposed to winner-take-all) analog spatiotemporal mappings. Each SOAFL is modular and mathematically self-contained, allowing arbitrary (fully or random, and delayed or decayed) connectivity between layers. Any number of SOAFLs can be combined, via user-specified connectivity schemes, to create many layered, self-organizing hierarchical neural networks that address specific problems. Thus the neural network of the present invention is hierarchical, allowing unlimited layers for spatiotemporal feature extraction/abstraction. Additional advantages of the present invention neural network over networks of prior art will become apparent by the following discussion.

In a preferred embodiment of the present invention, an unsupervised pattern categorization system employs a plurality of input nodes, a plurality of output nodes and modifying means, all arranged in a working layer. A presentation field presents input signals defining an input pattern to the input nodes. The input nodes are coupled, either fully or non-fully, to the presentation field to receive the input signals. Each input node categories patterns with respect to a plurality of categories. For each input signal received by an input node, the input node generates a net signal indicating similarity between the input pattern and patterns categorized by the input node. To accomplish this, for each input signal received by a input node, the input node has two adaptive long term memory weights. The long term memory weights encode the plurality of patterns categorized by the input node. In turn, the net signal is generated as a function of the long term memory weights and input signals to the input node.

The plurality of output nodes includes one output node for each input node. To that end, a different input node is connected to a different output node and each output node receives the net signal from the respective input node. In response to the received net signal, each output node selects a category of the corresponding input node. As a result, the plurality of output nodes provide a mapping between plural parts of the input pattern and plural categories. Each output node provides a short term memory output signal indicative of category selection.

The modifying means dynamically modifies category selections of the output nodes in a non-linear fashion such that sum of the output signals from the output nodes is within a predefined range. Upon the sum of output signals being within the predefined range, the output nodes provide categorization of the input pattern from the mapping between plural parts of the input pattern and plural categories of the input nodes. Preferably, the predefined range is a real number from 0 to the number of input nodes, non-inclusive.

In particular, the modifying means modulates the input nodes by broadcasting a modulation signal from a modulation node to the input nodes. In response to the modulation signal, each input node adapts the respective long term memory weights from respective initial values to respective final values. The final values are a function of the initial values, the modulation signal, and the output signal from the output nodes. The final values are determined as exact analytical values, as opposed to iterative approximations.

According to one aspect of the present invention for each input node, one of the long term memory weights of the input node controls generalization of spatiotemporal parts of input patterns (i.e., unsupervised feature learning). The other long term memory weight of the input node controls strength of input signals to the input node (i.e., self-organization of connectivity). In particular, strength of input signals to an input node is indicated both as a degree of connectivity from the presentation field to the input node, and as a shaping factor generalization of spatiotemporal parts of the input pattern. Preferably the degree of connectivity is in the range 0 to 1 inclusive. Zero indicates absence of connection between the presentation field and the input node, and one indicates relative strength between the presentation field and the input node.

The output signals may be binary values generated by a STEP function. Homeostasis occurs when the sum of the binary values equals a predefined value. This results in a finite mapping, which may be many-to-many or winner-take-all mapping depending on the predefined value. The choice for the predefined number of 1 results in winner-take-all mapping. The processing time to reach homeostasis is independent of both the predefined value and the size of the input field.

In a particular preferred embodiment, an analog data processing system is used to find the H highest-valued numbers from a set of N numbers. The set of numbers is presented to a neural network or analog circuit as a set of signals, each signal representing the magnitude of a respective number from the set of numbers. Each signal is presented to a node on the neural network. The node determines an output signal indicative of the relative magnitude of the number within the set of numbers. The output signal from each node is a binary value (i.e., either 0 or 1) obtained from a STEP function. The output signals are processed to homeostasis. At hemoeostasis, the sum of the output signals converge to H and the H nodes having an output signal of 1 indicate the H highest-valued numbers.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
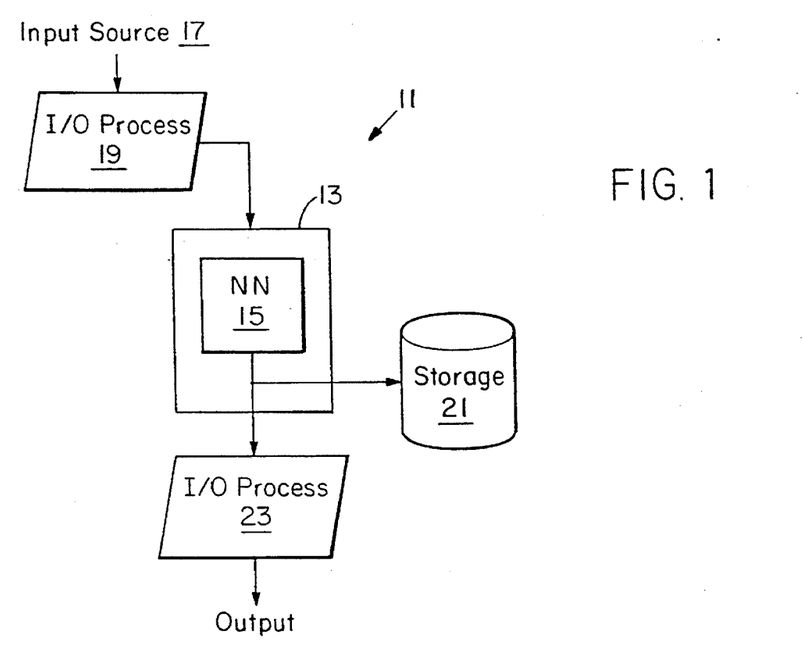
FIG. 1 is a block diagram of a network employing self-organizing analog field layers of the present invention.

Referring to FIG. 1, a computer system embodying a neural network of the present invention is generally shown at 11. The computer system employs a host processor 13 in which the operation of a neural network 15 are executed. Briefly, an input source such as on-line data from a workstation terminal, a sensor system, stored data from memory, and the like provides input to the computer system 11 at 17. The input is preprocessed by I/O processing 19 which queues and/or formats the input data as needed. The preprocessed input data is then transmitted to host processor 13 which processes the data through neural network 15. In particular, neural network 15 maps the input data to an output pattern and generates output for either memory storage 21 or display through an I/O device, e.g., a workstation display monitor, a printer, and the like. In the latter case the output data is formatted through I/O processing 23 and transmitted accordingly for display at a monitor or printing at a printer and the like. The computer system according to the invention is useful in applications including, but not limited to, speech recognition, language recognition, character recognition, word recognition, user identification, financial predictions, and market segmentation analysis.

Figure 2A:
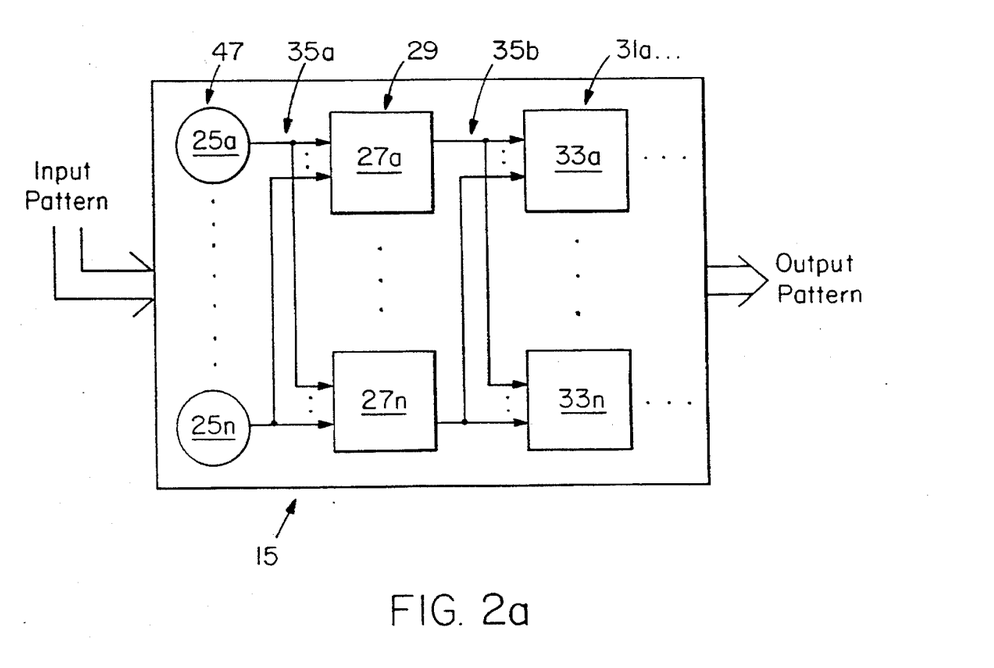
FIGS. 2a and 2b illustrates a circuit for implementing each self-organizing analog field layer of the network of FIG. 1.
Figure 2B:
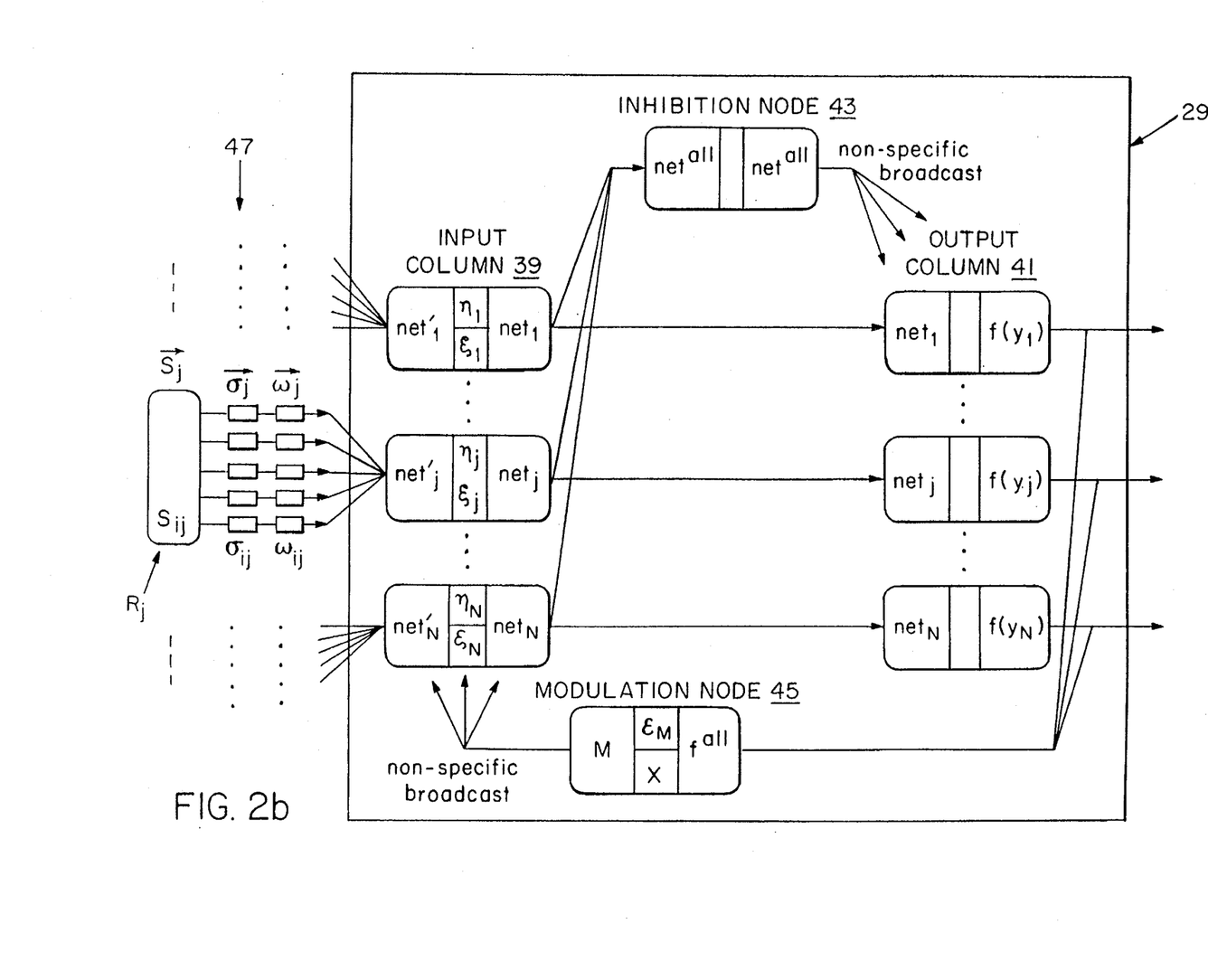

In more particular terms, neural network 15 maps an analog input pattern to an analog output pattern as illustrated in FIGS. 2a–2b and described next. Referring to FIG. 2a, an analog input pattern is received by neural network 15 at distribution nodes 25. Distribution nodes 25 are connected to a first layer or field 29 of self-organizing nodes 27.

Distribution nodes 25 are connected to nodes 27 in a manner such that each input node 25 provides input to each node 27. This is called "fully connected," although arbitrary connectivity is also allowed as discussed below. In response to this input, layer 29 of nodes 27 generates an output with contributions from plural nodes 27. That is, layer 29 provides a many-to-many mapping from the input pattern of distribution nodes 25 to the output of nodes 27a–27n.

The output pattern is transmitted to a succeeding layer 31 of self-organizing nodes 33 across transmission lines 35. Layer 31 similarly maps the received input pattern (i.e., output pattern of first layer 29) in a many-to-many fashion and produces an output pattern which subsequently serves as input to another layer, and so on. One or more such layers, like layer 29, are employed in a hierarchical or sequential arrangement to form neural network 15. Transmission lines 35 between layers may follow various connectivity schemes and in particular follow user specified connectivity schemes to create a many layered hierarchical neural network that addresses specific problems. Such connectivity schemes are within the purview of one skilled in the art and include fully connected, fully nonreflexive, random connectivity and/or receptive field connectivity schemes.

A single layer such as first layer 29, is detailed in FIG. 2b. Each such layer 29 is a self-organizing analog field layer to which the present invention is directed. It is understood that the succeeding layers 31 of FIG. 2a have similar architecture and defining equations as layer 29. Layer 29 is N nodes wide and contains 2N+2 working nodes. Included in the 2N+2 working nodes are N nodes which form input column 39, N nodes which form output column 41, inhibition node 43 and modulation node 45. Each of these working nodes receives on input a signal having the value indicated in the left hand third of the node, and generates a short term memory output signal value indicated in the right hand third of the node. Indicated in the central area of each of the working nodes are internal long term memory values where applicable.

A receptive field 47 provides input data to each input column node j. The portion of receptive field 47 that provides input to an input column node j is denoted $R_j$. The receptive field 47 may be of arbitrary size such that each $R_j$ includes any number of nodes of receptive field 47. The size of receptive field 47 is strictly a function of the connectivity schemes used in the hierarchy of layer 29 and succeeding layers 31. Because layer 29 has N receptive field inputs (one for each input column node) and N activation outputs (one from each output column node), the N node wide layer 29 may be treated as if it were a conventional neural network layer with N neurons/nodes in it. Hence, an input pattern to layer 29 at time t is defined by the set of vectors $I(t)=\{S_j(t); j=1=N\}$. $S_{ij}$ is then the input signal to input column node j from the ith node in receptive field 47. $S_j$ is the total input from receptive field 47 to input column node j, the nodes producing signal $S_j$ defining receptive field portion $R_j$. Receptive field 47 may be a short term memory serving as an input field. Processing of I(t) depends on the mode of operation of layer 29. In training mode, a single input pattern presentation to layer 29 lasts x PAML cycles, where PAML refers to Propagate, Activate, Modulate and Learn equations/rules.

The Propagate equation/rules are as follows. A similarity metric equation is given by $$net_j' = \left( \sum_{i=1}^{\psi_j} \sigma_{ij}(\gamma - |S_{ij} - \omega_{ij}|) \right)^\kappa \tag{1a}$$

where $$0 \leq S_{ij}(t) \leq 1, \tag{1b}$$

$$\gamma > 1, \tag{1c}$$

$$\kappa > 0, \tag{1d}$$

$$\sum_{i=1}^{\psi_j} \sigma_{ij}(0) = \psi \tag{1e}$$

where $$\sigma_{ij}(0) = \frac{\psi}{\psi_j}, \tag{1f}$$

and $$\omega_{ij}(0) = RAND(\omega_1, 1); \tag{1g}$$

where function RAND chooses a random number between the given arguments, and $$0 \leq \omega_1 \leq 0.5. \tag{1h}$$

A vigilance equation is given by $$net_j = net_j' \, e^{-\eta_j \Gamma} \left[ \frac{\xi_j - \eta_j net_j'}{\xi_j + \xi} \right]^+ \tag{2a}$$

where function $$[z]^+ = \begin{cases} 0 & \text{if } z \leq 0 \\ z & \text{if } z > 0 \end{cases}$$

$$\eta_j(0), \xi_j(0) = 0; \tag{2b}$$

$$\epsilon \ll 1; \tag{2c}$$

and $$\Gamma > 0. \tag{2d}$$

The Activate rules and equations are given by $$net^{all} = \sum_{j=1}^{N} net_j; \tag{3}$$

$$y_j = \left[ \frac{B\left(\frac{net_j}{net^{all}}\right) - C|M|\left(1 - \left(\frac{net_j}{net^{all}}\right)\right)}{\left(A + 1 - \left(\frac{net_j}{net^{all}}\right)\right)|M| + \left(\frac{net_j}{net^{all}}\right)} \right] \tag{4a}$$

where $$M(0) = \left(\frac{B}{C}\right)\left(\frac{1}{N-1}\right); \tag{4b}$$

$$f(y_j) = \left(\frac{1}{2}\right)\left[1 + \frac{\tan^{-1}\left(\lambda\left(y_j - \frac{B}{2}\right)\right)}{\tan^{-1}\left(\frac{\lambda B}{2}\right)}\right]^+ ; \tag{5}$$

$$f^{all} = \sum_{j=1}^{N} f(y_j); \tag{6a}$$

and $$STEP(z) = \begin{cases} 0 & \text{if } z \leq 0 \\ 1 & \text{if } z > 0 \end{cases} \tag{6b}$$

The Modulate rules and equations are as follows. The definition of homeostasis is given by $$(1-\alpha)H \leq f^{all} \leq (1+\alpha)H \tag{7a}$$

where $$0 < H < N \quad (7b)$$

and $$0 < \alpha < 1. \quad (7c)$$

Modulation node activation is given by $$X(-1) = 0, \epsilon_M(-1) = \epsilon_M(0) \quad (8a)$$

where $$M(0) = \left(\frac{B}{C}\right)\left(\frac{1}{N-1}\right). \quad (8b)$$

If homeostasis:

$$\epsilon_M(t) = \epsilon_M(0), X(t) = 0, \quad (8c)$$

$$\epsilon_M \frac{dM}{dt} = X(t) = 0 \text{ (i.e., no change to } M\text{), broadcast } (M).$$

If not homeostasis:

$$\epsilon_M(t) = \epsilon_M(t-1) \text{ if } X(t-1) = 0 \text{ or } X(t-1) = SIGN(f^{all} - H) \quad (8d)$$

else $\epsilon_M(t) = 2\epsilon_M(t-1), X(t) = SIGN(f^{all} - H), \epsilon_M \frac{dM}{dt} = X,$ if $M(t) \leq 0$ then $M(t) = \frac{M(t-1)}{2}$, broadcast $(-M)$;

where $$SIGN(v - w) = \begin{cases} -1 & \text{for } v - w < 0 \\ +1 & \text{for } v - w \geq 0 \end{cases};$$

$$\epsilon_M(0) = \frac{\%C}{9B} \text{ based on } \epsilon_M(0) \int_{M_{min}=0}^{M_{max}=19B/C} dM = \int_0^{\%} dt; \quad (8e)$$

assumes $$\frac{net_j^{max}}{net^{all}} \leq 0.9; \quad (8f)$$

and $$0 < \% \ll 1. \quad (8g)$$

The Learn rules and equations are as given by $$\epsilon_{LTM} \frac{d\omega_{ij}}{dt} = f(y_j)(S_{ij} - \omega_{ij})STEP(M) \quad (9a)$$

where the STEP function is as defined in Equation 6b;

$$\epsilon_{LTM} = \left(\frac{H}{N}\right) \frac{(1-\%)\tau}{\ln(10)} \quad (9b)$$

based on $$\epsilon_{LTM} \int_0^{0.9} \frac{d\omega_{ij}}{1-\omega_{ij}} = \frac{H}{N} \int_0^{(1-\%)\tau} dt. \quad (9c)$$

It is recognized that differential Equation 9a can be solved simultaneously to yield an equality equation instead of a differential equation. Solving the equation simultaneously speeds up the implementation of these equations by orders of magnitude to produce a more theoretically correct result. This occurs because equality equations implement faster than iterative equations, and the simultaneous solution gives an exact analytical answer rather than an approximate answer produced by the iterative equations. It has been found that simultaneously solving the equation improves performance by a factor of 50–1000 times. The resulting equality equation is given by $$\omega_{ij}^f = S_{ij} - (S_{ij} - \omega_{ij}^i)e^{-\frac{f(y_j)STEP(M)}{\epsilon_{LTM}}} \quad (9d)$$

where
  $\omega^i$ is the initial value of $\omega$, and
  $\omega^f$ is the final value of $\omega$.

An additional Learn equation is given by $$\epsilon_{LTM} \frac{d\sigma_{ij}}{dt} = -\sigma_{ij} f(y_j) \frac{|S_{ij} - \omega_{ij}|}{(\gamma - |S_{ij} - \omega_{ij}|)} STEP(M) \quad (10a)$$

if $$\frac{dnet_j'}{dt} = \sum_{i=1}^{\psi_j} \left(\frac{\partial net_j'}{\partial \omega_{ij}} \frac{d\omega_{ij}}{dt} + \frac{\partial net_j'}{\partial \sigma_{ij}} \frac{d\sigma_{ij}}{dt}\right) = 0 \quad (10b)$$

As discussed above regarding Equation 9a, differential Equation 10a can be solved simultaneously to yield an equality equation. The resulting equality equation is given by $$\sigma_{ij}^f = \sigma_{ij}^i \frac{[\gamma - |S_{ij} - \omega_{ij}^i|]}{[\gamma - |S_{ij} - \omega_{ij}^i|e^{-\frac{f(y_j)STEP(M)}{\epsilon_{LTM}}}]} \quad (10c)$$

where
  $\sigma^i$ is the initial value of $\sigma$, and
  $\sigma^f$ is the final value of $\sigma$.

Additional Learn equations are given by $$\epsilon_\Gamma \frac{d\eta_j}{dt} = f(y_j)STEP(M); \quad (11a)$$

$$\epsilon_\Gamma \frac{d\xi_j}{dt} = f(y_j) \, net_j' \, STEP(M); \quad (11b)$$

$$\eta_j(0), \xi_j(0) = 0; \quad (11c)$$

$$\epsilon_\Gamma = \frac{H}{N}(1 - \%)\tau \quad (11d)$$

based on $$\epsilon_\Gamma \int_0^1 d\eta_j = \frac{H}{N} \int_0^{(1-\%)\tau} dt, \text{ if } <f(Y_j)> = \frac{H}{N} \quad (11e)$$

where function $<z>$ is a time average of z. In addition, $$M(0) = \frac{B}{C}\left(\frac{1}{N-1}\right) \quad (11f)$$

based on $y_j = 0$ when $\frac{net_j}{net^{all}} - \frac{1}{N}$

As discussed above regarding Equations 9a and 10a, Equations 11a and 11b can be solved simultaneously to speed up processing to make the implementation more theoretically correct. The resulting equality equations are:

$$\eta_j^f = \eta_j^i + \frac{f(y_j) STEP(M)}{\epsilon_\Gamma}; \quad (11g)$$

and $$\xi_j^f = \xi_j^i + \frac{f(y_j)net_j' STEP(M)}{\epsilon_\Gamma}; \quad (11h)$$

where
  $\eta^i$ and $\xi^i$ are initial values, and
  $\eta^f$ and $\xi^f$ are final values.

Referring back to FIG. 2b, an input pattern presentation takes one time unit by definition, therefore each PAML cycle lasts 1/x time units. The total number of input patterns presented to layer 29 in training mode is denoted by τ. Training therefore takes τ time units. There is no concept of "fast" or "slow" learning; τ represents a critical window for self-organization much the same as is exhibited in the afferent working nodes of early perceptual systems such as that of Knudsen. See "The Role of Auditory Experience in the Development and Maintenance of Sound Localization," by E. I. Knudsen, *Trends in Neuroscience*, 7, 1984, pages 326–330.

The larger the time window, i.e., the more data one has to train on, the more likely the training set, and associated layer 29 learning/generalization, will characterize the performance set providing better results. Continuous and/or incremental learning after τ time units is possible.

In performance mode, an input pattern is presented to layer 29 for as many PAM (Propogate, Activate, Modulate) cycles as it takes to modulate the layer 29 to homeostasis described below. It is when layer 29 is in homeostasis that output column node activations (output in short term memory) are "meaningful".

To achieve multi-layered, hierarchal self-organizing neural networks, each layer 29 in the hierarchy must be able to produce and learn, unsupervised (i.e., without a teacher), a "meaningful", many-to-many, analog mapping from input space I(t) to output space f(y$_j$):j=1 to N. This is in contrast to popular unsupervised learning neural network architectures that utilize many-to-one ("or winner take all") competitive mechanisms to obtain their mappings without a teacher. This is also in contrast to popular supervised learning neural network architectures which can learn many-to-many analog mappings with a teacher because the teacher provides detailed error analysis of the mapping, which is ultimately used in the learning mechanism to gradually correct the errors and enhance the mapping over the training period. In the present invention, good many-to-many analog mappings are those that result in homeostasis. Homeostasis is defined as the condition that exists when the sum of all output column node activations, $f^{all}$ (Equation 6a), is within some homeostatics set points (Equations 7a, 7b, 7c).

To that end, for any input pattern, I(t), N output column node activations, f(y$_j$), will be produced that sum to $f^{all}$. If $f^{all}$ is outside of homeostasis, the modulation node 45 detects this and rapidly modulates layer 29 to homeostasis as described later. In homeostasis, there exists many output column nodes with varying analog activation values contributing to $f^{all}$. Hence, a many-to-many analog mapping, without a teacher is produced. Setting H in Equations 7a and 7b depends on the hierarchy and problem domain.

The foregoing processing of input pattern I(t) is accomplished in the preferred embodiment as follows. Referring to Equation 1a and FIG. 2b, the input from receptive field 47 (and in particular from R$_j$)) to input column node j is net'$_j$ which is referred to as a similarity metric. The similarity metric, net'$_j$, reflects how well the input pattern from receptive field 47 to input column node j, namely $\vec{s}_j$, compares to or matches prior experience as embodied in the connections between receptive field nodes i (where i=1 to Ψ$_j$ the size of R$_j$) and input column node j. In the present invention layer 29, two adaptive long term memory weights σ$_{ij}$ and ω$_{ij}$ are required per connection. Topological self-organization is governed by σ$_{ij}$. Unsupervised feature learning is governed by ω$_{ij}$. Because the number of receptive field 47 nodes connected to input column node j (i.e., the effective receptive field size, Ψ$_j$, with respect to input column node j) can be different from node to node in input column 39. Equations 1e and 1f impose a "law of conservation of synaptic strengths" on the initial values of σ$_{ij}$. This allows the similarity metric to be "fair" across different size receptive field inputs to nodes j in input column 39.

Figure 3A:
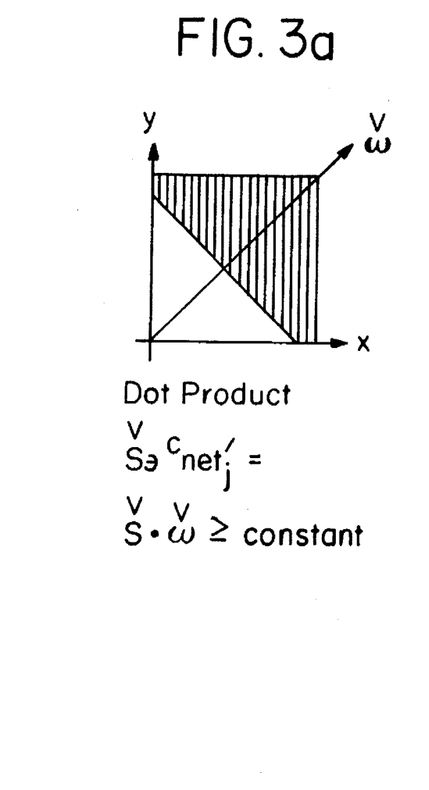
FIGS. 3a–3i illustrate similarity metrics utilized in neural networks.
Figure 3B:
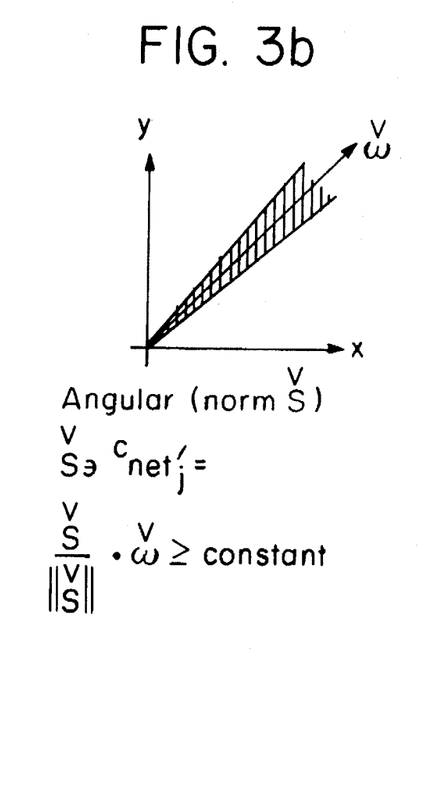
Figure 3C:
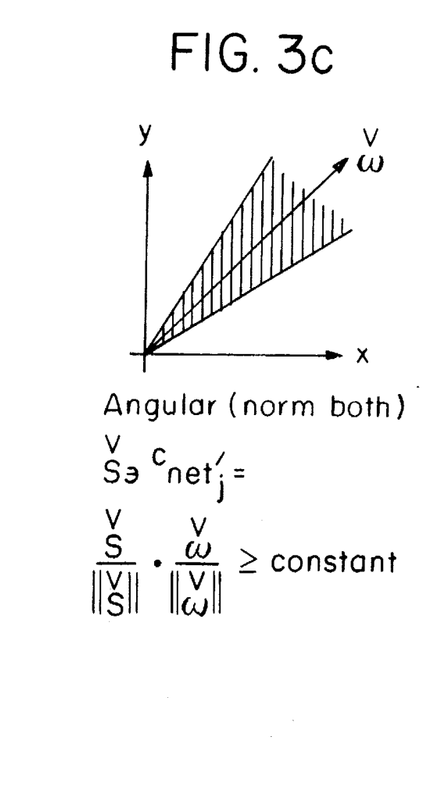
Figure 3D:
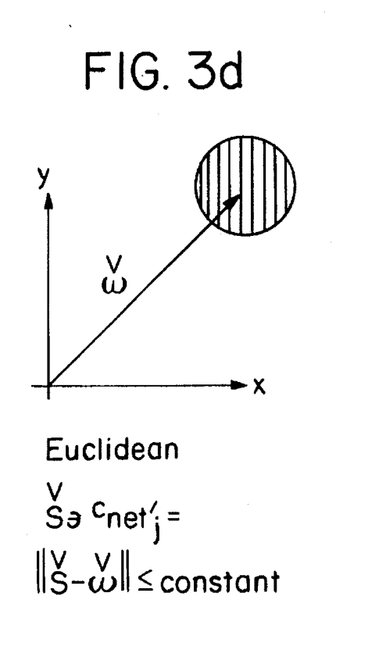
Figure 3E:
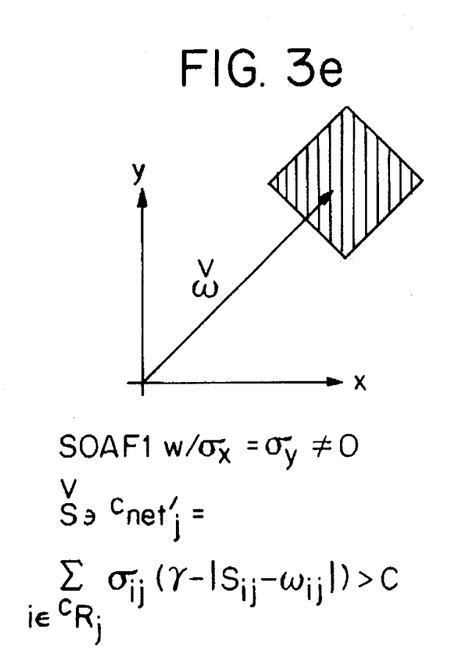
Figure 3F:
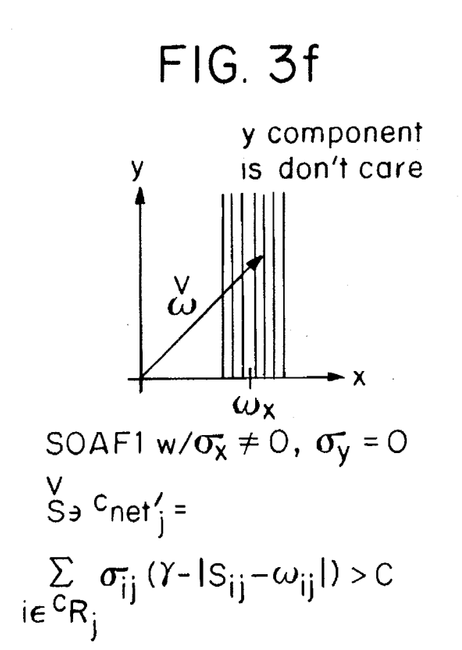
Figure 3G:
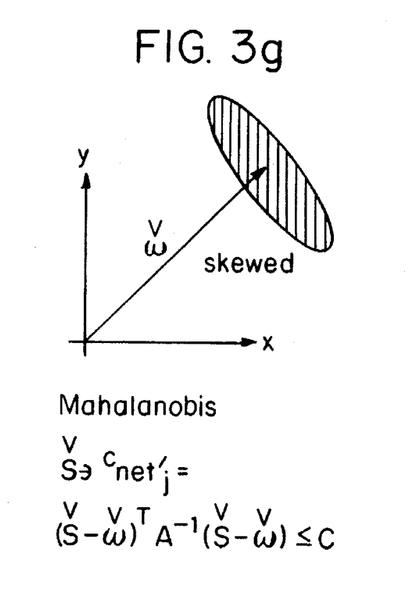

FIGS. 3a–3i compare the present invention layer 29 similarity metric to other known neural network metrics and statistical metrics. The shaded area about a feature vector ω$_j$ illustrates the decision volume of the given similarity metric. FIGS. 3a–3d and 3g illustrate similarity metrics of prior art while FIGS. 3e, 3f, 3h and 3i illustrate similarity metrics of the present invention. It is noted that the similarity metric of FIGS. 3a–3d do not depend on two adaptive long term memory weights (σ and ω) as in the present invention and the metric of FIG. 3g is extremely difficult to implement in a neural network.

Briefly, FIG. 3a illustrates a decision volume formed by an inner product of feature vector $\vec{\omega}_j$ and receptive field input $\vec{s}_j$. FIG. 3b illustrates a decision volume formed by the inner product of vectors $\vec{\omega}_j$ and $\vec{s}_j$ normalized. FIG. 3c illustrates a decision volume formed by the inner product of feature vector $\vec{\omega}_j$ normalized and input $\vec{s}_j$ normalized. FIG. 3d illustrates a decision volume formed by a Euclidean similarity metric. FIG. 3g illustrates a similarity metric from statistics.

Figure 3H:
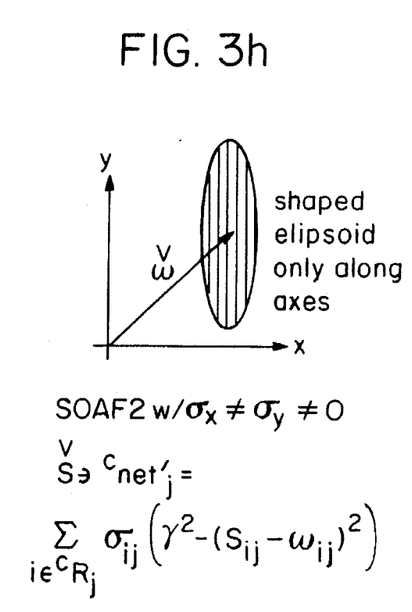
Figure 3I:
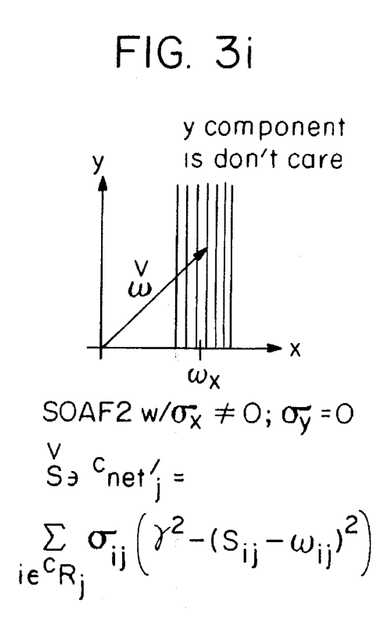

FIGS. 3e and 3h illustrate a similarity metric of the present invention layer 29 with equal, non-zero self-organization weights along the x and y dimension (i.e., σ$_{xj}$=σ$_{yj}$≠0). This results in a decision volume (shaded area) that resembles the Euclidean similarity metric shown in FIG. 3d. FIGS. 3f and 3i illustrate an alternative similarity metric of the present invention layer 29 with a "don't care" learning portion (for example along the y axis) incorporated in the decision volume. "Don't care" usage and its incorporation in the competitive and unsupervised learning/clustering process is a unique and extremely powerful property of the present invention. Greater details about long term memory and "don't care" learning are presented later. However it is clear from Equation 1a and the architecture of layer 29 illustrated in FIG. 2b, that if σ$_{ij}$ goes to zero via learning, the physical connection containing σ$_{ij}$ appears to atrophy. Hence topological self-organization is governed by σ$_{ij}$. Node and connection atrophication is a prevalent phenomenon during early brain development and critical windows of self-organization.

Referring back to FIG. 2b, every input column node j transforms its received similarity metric, net'$_j$, into another similarity metric net$_j$, according to Equation 2a. In Equation 2a the vigilance term, Γ, controls the discrimination/clustering potential of layer 29.

In a preferred embodiment per Equation 2a, vigilance effectively defines the decision volumes discussed above and depicted in FIGS. 3e–3f. This can be explained more easily by dropping ε in Equation 2a and rewriting it as $$\text{net}_j = \text{net}_j' \, e^{-\eta_j \Gamma} \left[ \frac{<\text{net}_j'> - \text{net}_j'}{<\text{net}_j'>} \right]^+ \quad (A1)$$

where $<\text{net}_j'>=\xi_j/\eta_j$ is a time-averaged similarity metric. Equations A1 and 11a–b show how $<\text{net}_j'>$ learns a weighted, time-average of the similarity metrics contributing to a nodes competitive winning performance. Per Equation A1, one can see that if net'$_j$ exceeds the time-averaged similarity metric for node j, its value is passed directly to the corresponding output column node j (i.e., net$_j$=net'$_j$e$^0$−net'$_j$). However, if net'$_j$ is less than $<\text{net}_j'>$, and exponential fall off (governed by the ramping adaptive vigilance term η$_j$(t)Γ and degree of mismatch) is applied to the similarity metric $net'_j$ to obtain a smaller similarity metric, $net_j$, used by the output column nodes for competition and ultimate output representation in homeostasis. This fall off has an effect of defining an absolute decision volume (e.g., defined by $e^{-1}$) about the similarity metric as shown in FIGS. 3e–3i. Actually, though $e^{-z}$ is a "soft" delimiter, it allows outliers with extremely poor mismatches to compete if and only if all other matches in layer 29 are relatively poor and modulation is driving $f^{all}$ up to achieve homeostasis.

This absolute/relative phenomena is critically important to handle the following duality during training without a teacher:

- An "apparent" outlier is presented early in training but will eventually become (or help develop) a cluster centroid. In this case, the appearance of being an outlier is more strongly influenced by the random weight initialization scheme which caused the poor mismatches than the statistics of the training set. Both Equation A1 and modulation to homeostasis force nodes with the smallest, in a relative sense, ramping adaptive vigilances, $\eta_j(t)\Gamma$, to activate and eventually learn pertinent features associated with the non-outlier input pattern. This forces the active and meaningful participation of all weight vectors, $\omega_j$, in the learning process independent of weight initialization or problem domain.

- An "actual" outlier is presented late in training and should not be learned by layer 29. In this case, both Equation A1 and the drive to homeostasis tend to "spread" activation across output column nodes thereby diluting node activations $f(y_j)$ and associated learning rates according to Equations 9a–10b and especially 9c. In addition, a single poor contribution to the $\eta_j$ and $\xi_j$ learning equations (Equations 11a–b) cannot effect $<net'_j>$ late in training. It should also be noted that the effects of actual outliers presented early in training tend to be washed away by the learning/generalization/clustering process for all non-outliers during the training period, $\tau$. Hence, the effect of outliers (or clutter) during training is minimal. Empirical results (training with varying degrees of clutter), not predicted by theory, indicate that the presence of clutter enhances layer 29's performance by increasing generalization during learning, as indicated by the reduced number of node resources needed to obtain comparable levels of clustering/discrimination/recognition without clutter.

In a preferred embodiment, $\Gamma$ controls the development of decision volumes during training. Thus, implementations of layer 29 should use $\Gamma$ as the key parameter for tuning layer 29 to optimal performance for the particular problem domain being addressed. Referring back to FIG. 2b, by definition the Equation 2a similarity metric $net_j$ is preserved across output column 41, if and only, if for any input pattern $I(t)$ at any time t, output node activation of output column node k is greater than that of output column node j (i.e., $f(Y_k) > f(Y_j)$ whenever $net_k > net_j$ for all j,k=1 to N. Because the modulation process drives $f^{all}$ (and therefore each output column node activation, $f(y_j)$) up or down to achieve homeostasis, the modulation process must: (i) preserve the similarity metric to ensure meaningful mappings, and (ii) must be able to achieve any specific homeostasis H (Equation 7b).

This is accomplished by Equation 4a which Applicant has derived from Grossberg's on-center, off-surround competitive, shunting equation for output column nodes j:

$$\epsilon_{STM} \frac{dy_j}{dt} = \qquad (B1)$$

$$-Ay_j + (B-y_j)(net_j + f(y_j)) - (C + y_j) \sum_{\substack{k=1 \\ k \neq j}}^{N} f(y_k)$$

See G. A. Carpenter and S. Grossberg, "ART2 Self-Organization of Stable Category Recognition Codes for Analog Input Patterns," *Applied Optics*, Dec. 1, 1987, pages 4919–4930. Equation B1 preserves the similarity metric only if all $y_j$'s are set to zero whenever a new input pattern, I(t) is presented. This is called reset. Equation B1 also guarantees that in steady state: $-C$(lower shunt) $\leq y_j \leq B$ (upper shunt). After reset, the on center term, $f(y_j)$ helps accelerate the Equation B1 dynamics, via a positive feedback loop, to a steady state condition in which there is only one output column node with positive node activation, $Y_w$, called the winner (winner-take-all). Because the similarity metric is preserved, the winner is the output column node with the greatest $net_j$.

In the present invention layer 29, homeostasis amongst all output column nodes, not a winner-take-all activation, is desired. Hence, applicant drops the on center term $f(y_j)$ from Equation B1, and still preserve the similarity metric. Also because the similarity metric is preserved, Applicant bases lateral inhibition on input values to output column 41 rather than the output values from those nodes to obtain $$\epsilon_{STM} \frac{dy_j}{dt} = -Ay_j + (B-y_j)net_j - (C+y_j) \sum_{\substack{k=1 \\ k \neq j}}^{N} net_k. \qquad (B2)$$

Now let competition be based on a normalized similarity metric, $net_j/net^{all}$ (see Equation 3), rather than $net_j$. This still preserves the similarity metric and has the effect of limiting all input values to the range 0 to 1. Also, non-specific (broadcast) modulation, M, is allowed to control/scale total lateral inhibition, to obtain $$\epsilon_{STM} \frac{dy_j}{dt} = -AMy_j + (B-y_j) \frac{net_j}{net^{all}} - \qquad (B3)$$

$$M(C+y_j) \sum_{\substack{k=1 \\ k \neq j}}^{N} \frac{net_k}{net^{all}}.$$

Solving Equation B3 for steady state, one obtains the activation transfer function for all output column nodes in layer 29. Re-arranging terms, one obtains:

$$Y_j = \frac{\left[ B\left(\frac{net_j}{net^{all}}\right) - CM\left(1 - \left(\frac{net_j}{net^{all}}\right)\right) \right]}{\left[ \left(A + 1 - \left(\frac{net_j}{net^{all}}\right)\right)M + \left(\frac{net_j}{net^{all}}\right) \right]}, \qquad (B4)$$

which leads to Equation 4a which uses the absolute value of M as explained below.

Equation B4 and hence Equation 4a exhibit five key and extremely desirable properties for a neural network of the present invention. These properties are:

(1) for any input pattern, I(t), and any positive modulation, M, the similarity metric is preserved;

(2) as M goes to zero, all output column nodes $y_j$ approach their upper shunt, B, independent of the input pattern;

(3) as M gets large, all output column nodes $y_j$ become negative, independent of the input pattern;

(4) reset and therefore explicit knowledge of when a new input pattern is presented to layer 29 is not required.

This is due to Equation B4 (and Equation 4a) depending only on $net^{all}$ and $net_j$, and not on-center term $f(y_j)$, both of which change automatically when a new input pattern is presented to layer 29; and (5) Equation B4 (and hence Equation 4a) is an equality equation not a differential equation as used in the prior an Equation B1.

Based on properties (2) and (3) above, and on Equation 5, one can see that for any input pattern, I(t), the modulation node 45 in FIG. 2b can modulate layer 29 to any specified homeostasis, H (Equation 7b), and still preserve the similarity metric. Hence, many-to-many, "meaningful", analog mappings, without a teacher, are enabled. When one replaces the sigmoid function in Equation 5 with a STEP function (equation 6b), one obtains a novel and powerful mechanism (that is massively parallel and extremely fast) to find the top H values of any number of N values. For example, given the N=20 values of {2.3, 1.6, 0.2, 2.2, 4.8, 0.3, 0.01, 9.0, 9.2, 6.7, 3, 8, 1.1, 15, 0.2, 0.34, 5.1, 6.8, 6.6, 10}, the top H=4 values are: {15, 10, 9.2, 9.0}. An attempt to mentally solve this problem immediately illustrates the time consuming aspects of the requisite computations. In an application, N may exceed 1,000,000 and H may be greater than 100.

Determining these top values usually requires sorting the N values, then picking the top H values as the answer. State-of-the-art techniques to solve this problem generally require processing times that are a function of N, the number of items being sorted, and H, the top number of items being requested. As N and H get large, the processing time gets long.

The modulation mechanism of the invention solves this problem extremely fast. Using 20 neurons, set $net_j$(j=1 to 20) to each of the 20 values in the example. Set H equals to 4. The modulation equations are processed to homeostasis (using a step function instead of a sigmoid function for equation 5, i.e., $f(y_j)$=STEP($y_j$)). The output neurons with $f(y_j)$ values near 1 are the answer to the problem. All other output values are zero. The modulation time (FIG. 4) to reach this solution is independent of both N and H. Implementing the modulation mechanism as analog circuitry provides a massively parallel, rapid mechanism to find the top H values from a list of N values independent of H and N. Such a device is extremely useful in many information processing, communications, database, encryption, data compression, and process control applications, as well as in neural network designs.

More specifically, when the sigmoid function in Equation 5 is replaced by the STEP function and H is set equal to 1, one obtains a novel mechanism to achieve rapid, competitive winner-take-all via modulation mechanisms that are much faster and computationally cheaper than the simultaneous differential equations of prior art given by Equation B1.

In sum, modulation is provided by modulation node 45 which receives an input value $f^{all}$ defined as the sum of output column node activation signals $f(y_j)$, i.e., output values of output column nodes in short term memory. See Equations 4a–6a. According to Equation 7–8e, modulation node 45 non-specifically broadcasts (i.e., transmits to input column 39) a modulation signal M to all structures. Although according to Equation B4, M is always positive, modulation node 45 broadcasts a sign with modulation signal M to indicate whether layer 29 is in homeostasis (positive) or outside (negative). This is the reason that the absolute value of M is used in Equation 4 as opposed to M from Equation B4.

Further, according to Equation B4 (and hence Equation 4) M controls total inhibition. Therefore, as M increases the $f(y_j)$'s and $f^{all}$ decrease. As M decreases, the $f(y_j)$'s and $f^{all}$ increase. SIGN($f^{all}$–H) drives the rate change of M (Equation 8d) to guarantee convergence to homeostasis. Equation 8e guarantees that worst case mismatches between $f^{all}$ and H can be narrowed within a percentage of PAML cycles. This percentage is denoted $\%_x$, where $0<\%<<1$ according to Equation 8g. Doubling $\epsilon_M$ upon the occurrence of any ($f^{all}$–H) sign change guarantees rapid damping if convergence "overshooting" occurs. Throughout the foregoing, inhibition node 43 provides to output column 41 a non-specific broadcast of the value of $net^{all}$, the normalizing term used in Equation 4a. Inhibition node 43 accomplishes this by summing the similarity metrics $net_j$ output from each input column node according to Equation 3.

Figure 4:
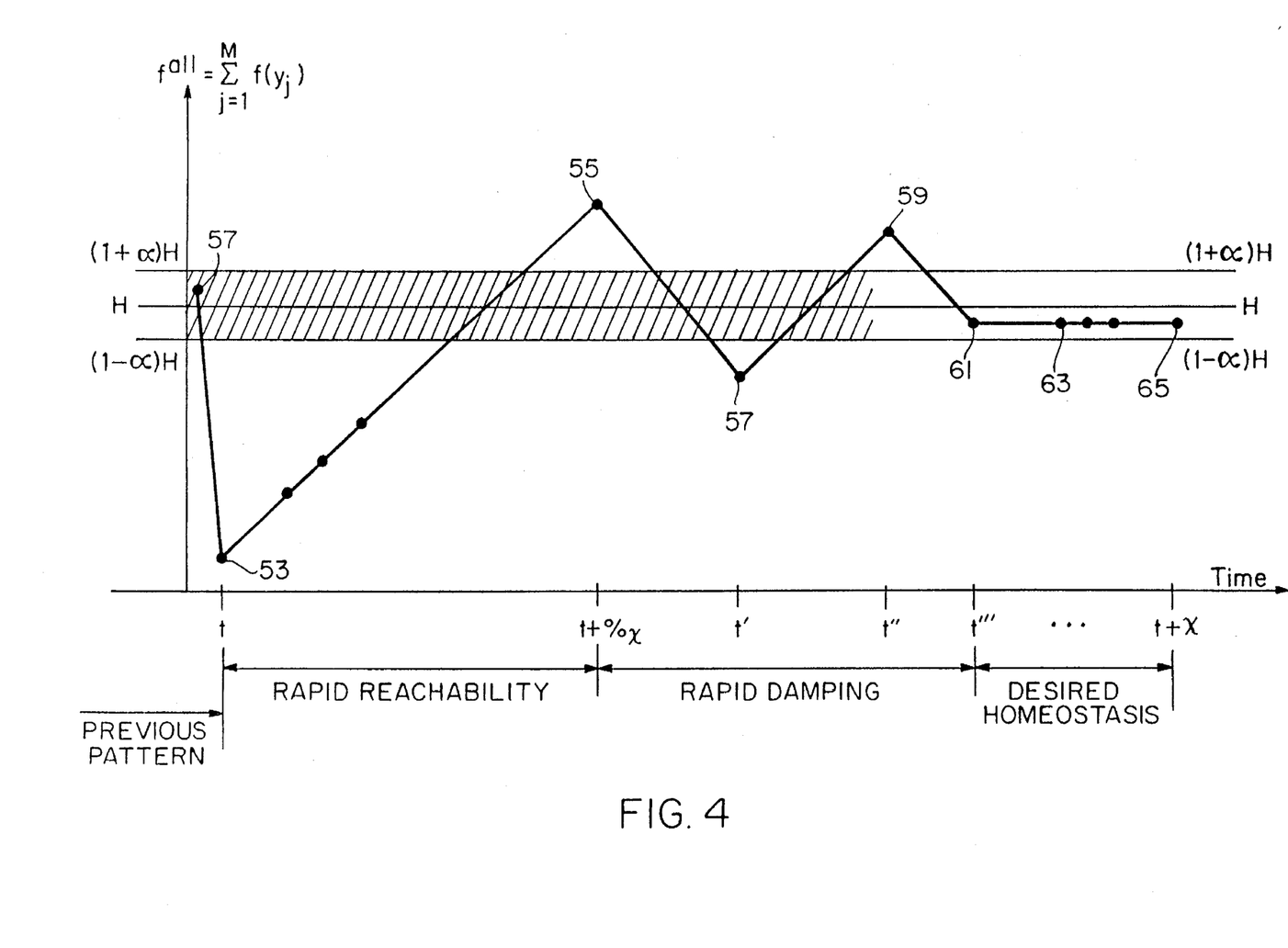
FIG. 4 is a graphic illustration depicting the modulation process within the layer of FIG. 2.

As mentioned previously it is when layer 29 is in homeostasis that output column node activations are "meaningful" both for learning and for output to any succeeding layers 31 in the neural network hierarchy. Hence, it is imperative that for any possible input pattern, I(t), homeostasis be achieved rapidly, i.e., within a percentage, %, of the total number PAML cycles $_x$, devoted to processing the input pattern. FIG. 4 depicts the above described modulation process given by Equations 7–8e which as currently tested achieve homeostasis well within $\%_x$ cycles. The graph of FIG. 4 plots $f^{all}$ with respect to time where $f^{all}$ is a function of input pattern, prior learning, H and M (see Equations 5 and 6a). Homeostasis from Equation 7 is depicted in FIG. 4 as a shaded band from $(1-\alpha)$H to $(1+\alpha)$H across all t (time) in the graph of FIG. 4.

Point 51 in FIG. 4 illustrates for a previous pattern at time (t–1), modulation signal M provides pa within homeostasis. At time t a new input pattern occurs. At this time although modulation signal M remains the same as M at time (t–1), $f^{all}$ may drop out of homeostasis to point 53 according to Equation 6a which is dependent on the new input pattern and prior learning, amongst other factors.

From time t to $t+\%_x$ (for example $0.20_x$ cycles), the modulation process exhibits rapid reachability. To that end, according to Equation 8d, the modulation process (i) obtains H–$f^{all}$ at time t where at that time $f^{all}$ is less than H, thus effectively producing a sign change in the term ($f^{all}$–H);

(ii) obtains the same modulation term $\epsilon_M$ as at time t; and (iii) broadcasts –½ M at time t if M at time $(t+\%_x)$ is less than or equal to zero.

Point 55 results at time $(t+\%_x)$, and illustrates that $f^{all}$ at that time is still out of homeostasis for the current input pattern.

From time $(t+\%_x)$ to time t', the modulation process obtains another sign change in the term ($f^{all}$–H) but doubles modulation term $\epsilon_M$ according to Equation 8d. The modulation process repeats this change of sign in the term ($f^{all}$–H) and the doubling of modulation term $\epsilon_M$ until $f^{all}$ converges to homeostasis (shaded band). The repetition toward convergence is illustrated by points 57, 59 and 61 at times t', t" and t'" respectively. The behavior of the modulation process from time $(t+\%_x)$ to time t'" is referred to as rapid damping.

From time t'" to time $(t+_x)$, $f^{all}$ is within homeostasis. Thus, the modulation process does not change the modulation term $\epsilon_M$ or the modulation signal M (i.e., broadcast the same modulation signal M). Points 63 though 65 are illustrative. Thus the modulation process from time t to $(t+_x)$, for a given input pattern, may be summarized as $$\epsilon_M \frac{dM}{dt} = \begin{cases} \text{SIGN}(f^{all} - H) & \text{if } f^{all} \text{ out of homeostasis} \\ 0 & \text{if } f^{all} \text{ is within homeostasis} \end{cases}$$

Further, because the similarity metric is preserved, modulation to homeostasis provides a rapid content addressable memory, driving the layer 29 dynamics to steady state in much the same manner as a governing Lyapunov function with a single global minima.

Now that the details of modulation to homeostasis has been discussed, "learning" of layer 29 is discussed next. The STEP function with argument M (e.g., STEP(M), see Equation 6b) is used in all main learning equations (Equations 9a, 10a, 11a–b) of layer 29. Because STEP(M) is non-zero only when the broadcast of modulation signal M is positive indicating homeostasis, learning only occurs in homeostasis.

Homeostasis provides an extra degree of freedom to solve the learning dynamics for $\sigma_{ij}$. Equation 10b ensures that long term memory learning will not drive layer 29 out of homeostasis. All terms are known in Equation 10b, except $d\sigma_{ij}/dt$, which can then be solved to obtain Equation 10a. Equations 10a and 1a are critical to the uniqueness and power of layer 29. Equation 10a, topological self-organization, atrophies "bad" connections within receptive fields 47. One can characterize this as subset learning (i.e., only a subset of the original receptive field 47 is important to the similarity metric). This results in the seamless incorporation of "don't care" learning into the natural, statistical, competitive feature learning/clustering process of Equations 1a–9c.

In addition, Equation 10a drives decision volumes from those of FIG. 3e to those of FIG. 3f for a node's receptive field $R_j$ if it contains connections that exhibit high signal variance relative to the other connections, when the node is highly activated. Notice that $\sigma_{ij}$ monotonically decreases with time. Good connection input/feature matches (i.e., small $|S_{ij}-\omega_{ij}|$) retard atrophication, while poor matches accelerate atrophication. The degree of nodal analog activation, while in homeostasis, directly correlates to the degree of connection input/feature matches across the node's receptive field $R_j$. Hence, many-to-many, analog mappings can result in rich and diverse learning (without a teacher) from subset learning, based on the output analog values (and also from random connectivity that "looks" at and learns different portions of the input pattern).

Accordingly, the present invention provides a neural network working layer or field 29 that contains two adaptive weights per physical connection. Learning (changing of weights) occurs via a separate mechanism for each weight, namely, (1) unsupervised learning to learn/generalize spatiotemporal features, and (2) topological self-organization to control the degree of physical connectivity between nodes, e.g., 1.0=strongly connected, 0.1=weakly connected, and 0=not connected or completely atrophy. In addition to utilizing fundamentally new node activation and weight learning mechanisms, a third degree of freedom is introduced by the present invention and referred to as homeostasis. Homeostasis controls (to within homeostatic set points) the total amount of activation in an output column of nodes, thereby permitting multiple analog outputs from layer 29 as opposed to a winner-take-all output. To that end, input patterns with analog values received by nodes in an input column map to output patterns with analog values output by nodes of the output column, where the mapping is learned via self-organizing mechanisms. Homeostasis is achieved by non-specific broadcast nodes that modulate/inhibit total column (input column or output column) activation and individual weight learning.

As a result, multiple fields 29 may be used to form multi-layer hierarchical neural networks. Such a neural network is capable of extracting and abstracting spatiotemporal features for the purpose of spatiotemporal pattern categorization, robust classification, and novelty detection. Other important capabilities of this type of neural network include (1) subset learning, i.e., the ability to learn subsets of the input pattern rather than the entire input pattern if that is desired, (2) discovering natural spatiotemporal clusters in input space and mapping to orthogonalized representations in output space; (3) fast learning or slow learning; and (4) arbitrary connectivity (topology) between such layers/fields 29.

Variant Preferred Embodiment

In a variant preferred embodiment of the invention, the user or operator is provided with more control via more tuning parameters. The tuning parameters permits the user to find "natural structure" for non-parametric problems that are extreme in their clustering difficulty. This is also extremely useful when the input patterns are of high dimensionality. The tuning parameters in a variant embodiment are more intuitive from a mathematical and operator perspective.

For the Propagate equation/rules, the similarity metric Equation 1a is given by $$net_j' = \left[ \sum_{i=1}^{\psi_j} \sigma_{ij}(\gamma - (S_{ij} - \omega_{ij})^2) \right]^\kappa \quad (1a')$$

The condition Equations 1b–1h remain the same, except that Equation 1c is given by $$\gamma \geq 1, \quad (1c')$$

with $\gamma$ preferably set equal to 1.0. Note that Equation 10c' (below) must be implemented carefully to avoid the denominator approaching 0.

The vigilance Equations 2a–2d are given by $$net_j = net_j'[\epsilon + e^{\eta_j}e^{-\eta_j \frac{[\xi_j - net_j']^+}{\xi_j(1-\Gamma_j)}}] \quad (2a')$$

where $$\eta_j(0) = 0.0, \xi_j(0) = \psi^\kappa \left[ \gamma - \frac{\Delta_{intra}^2}{\psi_j} \right]^\kappa \quad (2b')$$

with $0 < \Delta_{intra}$: tuning parameter;

$$\epsilon < 1; \quad (2c')$$

and $$\Gamma_j = \left[ \frac{\gamma - \frac{(\Delta_{intra} + \Delta_{inter})^2}{\psi_j}}{\gamma - \frac{\Delta_{intra}^2}{\psi_j}} \right]^\kappa \quad 2d'$$

with $0 < \Delta_{inter}$: tuning parameter. In addition, $$\eta' = \ln(h)[1.0 - e^{-\phi \ln(100)}] \quad (2e')$$

where $h, \phi$ can be tuned, but are preferably set to 1000, 0.05.

The Activation and Modulation Equations 3 through 8g are unchanged from the above definitions.

The synapse Learning Equations 9a through 9c are given by $$\frac{d\omega_{ij}}{dt} = \quad (9a')$$

$$f(y_j)STEP(M)(S_{ij} - \omega_{ij}) \left[ \frac{STEP(net_j - \Gamma_j \xi_j)}{\epsilon_{LTM_1}} + \frac{\left[1 - \frac{\eta_j}{\eta'}\right]^+}{\epsilon_{LTM_2}} \right]$$

where the STEP function is defined in Equation 6b;

$$\epsilon_{LTM_1} = \frac{1.0}{\ln\left(\frac{Q_{LTM_1}}{Q_{LTM_1} - 1}\right)} \quad (9b')$$

where $Q_{LTM_1} > 1$ can be tuned, but is preferably set to 2;

$$\epsilon_{LTM_2} = \left(\frac{1}{\Omega}\right)\left(\frac{\phi}{\ln(10)}\right)\left(\frac{\tau}{N}\right) \quad (9c')$$

where $\Omega > 0$ can be tuned, but is preferably set to 1;

$$\omega_{ij}^f = \quad (d')$$

$$S_{ij} - (S_{ij} - \omega_{ij}^i) e^{-f(y_j)STEP(M)\left[\frac{STEP(net_j - \Gamma_j \xi_j)}{\epsilon_{LTM_1}} + \frac{\left[1 - \frac{\eta_j}{\eta'}\right]^+}{\epsilon_{LTM_2}}\right]}$$

where $\omega^i$ and $\omega^f$ are the initial and final values of $\omega$, respectively. Equation 9d' is the equality equation for the differential equation 9a'.

The synapse Learning equation 10a is given by $$\epsilon_{LTM_1} \frac{d\sigma_{ij}}{dt} = \quad (10a')$$

$$\frac{2\sigma_{ij}f(y_j)(S_{ij} - \omega_{ij})^2}{\gamma - (S_{ij} - \omega_{ij})^2} [STEP(M)STEP(net_j - \Gamma_j \xi_j)STEP(\eta_j - \eta')].$$

Equation 10b still holds when the following condition is met:

$$[STEP(M)STEP(net_j - \Gamma_j \xi_j)STEP(\eta_j - \eta')] = 1.0$$

In addition, the equality equation for differential equation 10a' is given by $$\sigma_{ij}^f = \quad (10c')$$

$$\sigma_{ij}^i \frac{\gamma - (S_{ij} - \omega_{ij}^f)^2}{\gamma - (S_{ij} - \omega_{ij}^i)^2 e^{\frac{-2f(y_j)[STEP(M)STEP(net_j - \Gamma_j \xi_j)STEP(\eta_j - \eta')]}{\epsilon_{LTM_1}}}}$$

The neuron Learning equations 11a through 11e are given by $$\epsilon_\eta \frac{d\eta_j}{dt} = \ln(h) - (\ln(h) - \eta_j)STEP(net_j - \xi_j); \quad (11a')$$

$$\xi_j^f = \begin{cases} net_j - [net_j - \xi_j^i]^+ e^{-\frac{1}{\epsilon_\xi}} & \text{if } (\eta_j > \eta') \text{ and } (net_j > \Gamma_j \xi_j) \\ \xi_j^i & \text{otherwise} \end{cases} \quad (11b')$$

where $\xi^i$ and $\xi^f$ are the initial and final values for $\xi$, respectively.

$$\eta_j(0) = 0.0, \xi_j(0) = \psi^\kappa \left[\gamma - \frac{\Delta_{intra}^2}{\psi_j}\right]^\kappa \quad (11c')$$

$0 < \Delta_{intra}$:tuning parameter;

$$\epsilon_\eta = \left(\frac{\tau}{N}\right)\left(\frac{1}{\ln(100)}\right), \epsilon_\xi = \frac{1.0}{\ln\left(\frac{Q_\xi}{Q_\xi - 1}\right)} \quad (11d')$$

where $Q_\xi > 1$ can be tuned, but is preferably set to 5, based on $$\epsilon_\eta \int_0^{.99\ln(h)} \frac{d\eta_j}{\ln(h) - \eta_j} = \int_0^{\frac{\tau}{N}} dt. \quad (11e')$$

Equation 11f remains unchanged.

The equality equation for differential equation 11a' is given by $$\eta_j^f = \ln(h) - [\ln(h) - \eta_j^i] e^{-\frac{1}{\epsilon_\eta}}, \quad (11g')$$

where $\eta^i$ and $\eta^f$ are the initial value and final value of $\eta$, respectively.

The primary tuning parameter $\Delta_{inter}$. All of the other tuning parameters, while important, can be preset or found via empirical experimentation with the training set and self-organizing analog fields. In particular, preferably H=1 during learning mode and H=0.3(N−1)+1 at all other times.

In the variant embodiment, the decision volumes are controlled by $\Delta_{intra}$ and $\Delta_{inter}$, which are the key tuning parameters and determine both $\Gamma_j$ and $\xi_j(0)$.

Equivalents

While the invention has been particularly shown and described with reference to preferred embodiments thereof, it will be understood by those skilled in the art that various changes in form and details may be made therein without departing from the spirit and scope of the invention as defined by the appended claims. For example, a preferred embodiment sets parameters of the Propagate, Activate, Modulate and Learn rules/equations as follows:

| | |
|---|---|
| $\gamma = 1.00$ | $A = B = C = 1$ |
| $1 \leq \kappa \leq 5$ | $\lambda = 4$ |
| $\psi = 1$ | $\alpha = 0.1$ |
| $\epsilon = 10^{-6}$ | $\% = 0.2$ |

$\omega_1 = 0$ if from receptive field 47, otherwise 0.5.

It is understood that other parameter settings are suitable.
I claim:

1. A pattern categorization system comprising:
   a presentation field for presenting input signals defining an input pattern;
   a plurality of input nodes, each for categorizing patterns with respect to a plurality of categories, the input nodes being coupled to the presentation field for receiving the input signals, for each input signal received by an input node, the input node having two weights having a respective value, the weights being indicative of a plurality of patterns categorized by the input node such that a net signal is generated as a function of the weights and input signals to the input node, and the net signal is indicative of similarity between the input pattern and patterns categorized by the input node;
   a plurality of output nodes, one for each input node such that a different input node is connected to a different output node and each output node receives the net signal from the respective input node, and in response to the respective received net signal each output node selecting a category of the corresponding input node such that the output nodes provide a mapping between plural parts of the input pattern and plural categories, each output node providing an output signal indicative of category selection;
   a modulation mechanism coupled between the output nodes and the input nodes, for modifying category selections of the output nodes by modulating the input nodes with a modulation signal such that the sum of the output signals from the output nodes is within a predefined range, upon the sum of the output signals being within the predefined range, the output nodes providing categorization of the input pattern from the mapping between plural parts of the input pattern and plural categories of the input nodes; and for each weight of the input nodes, a learning mechanism for adapting the respective value of each weight to an exact analytical value in response to the modulation signal.

2. A system as recited in claim 1 wherein the system is unsupervised.

3. A system as recited in claim 1 wherein the mapping is many-to-many mapping.

4. A system as recited in claim 1 wherein for each input node a weight of the input node controls generalization of spatiotemporal parts of the input patterns.

5. A system as recited in claim 1 wherein for each input node a weight of the input node controls strength of the input signal to the input node, the strength of the input signal being indicated both as a degree of connectivity from the presentation field to the input node, and as a shaping factor generalization of spatiotemporal parts of the input pattern.

6. A system as recited in claim 5 wherein the degree of connectivity is in the range of 0 to 1, 0 indicating absence of connection between the presentation field and the input node, and 1 indicating relative strength of connection between the presentation field and the input node.

7. A system as recited in claim 1 wherein the predefined range is between 0 and the number of input nodes in the plurality of input nodes.

8. A system as recited in claim 7 wherein the predefined range is a real number.

* * * * *